US012620351B2

(12) United States Patent
Yao et al.

(10) Patent No.: US 12,620,351 B2
(45) Date of Patent: May 5, 2026

(54) DISPLAY PANEL AND DISPLAY DEVICE

(71) Applicant: HEFEI VISIONOX TECHNOLOGY CO., LTD., Anhui (CN)

(72) Inventors: Yuan Yao, Anhui (CN); Yiming Xiao, Anhui (CN); Zhengkui Dong, Anhui (CN); Liusong Ni, Anhui (CN); Zhenhai Yue, Anhui (CN); Yuting Fu, Anhui (CN)

(73) Assignee: HEFEI VISIONOX TECHNOLOGY CO., LTD., Hefei (CN)

( * ) Notice: Subject to any disclaimer, the term of this patent is extended or adjusted under 35 U.S.C. 154(b) by 83 days.

(21) Appl. No.: 18/640,175

(22) Filed: Apr. 19, 2024

(65) Prior Publication Data

US 2024/0428727 A1 Dec. 26, 2024

Related U.S. Application Data

(63) Continuation of application No. PCT/CN2024/079801, filed on Mar. 4, 2024.

(30) Foreign Application Priority Data

Jun. 26, 2023 (CN) ......................... 202310771124.9

(51) Int. Cl.
*G09G 3/3208* (2016.01)

(52) U.S. Cl.
CPC .................................. *G09G 3/3208* (2013.01)

(58) Field of Classification Search
CPC .. G09G 3/3208; H10K 59/121; H10K 59/122; H10K 59/129; H10K 59/131;
(Continued)

(56) References Cited

U.S. PATENT DOCUMENTS

2021/0043715 A1 2/2021 Han et al.
2022/0131113 A1 4/2022 Jung et al.
(Continued)

FOREIGN PATENT DOCUMENTS

CN 104425560 A 3/2015
CN 109560089 A 4/2019
(Continued)

OTHER PUBLICATIONS

International Search Report issued on Apr. 29, 2024, in corresponding International Application No. PCT/CN2024/079801, 6 pages.
(Continued)

*Primary Examiner* — Stacy Khoo
(74) *Attorney, Agent, or Firm* — Maier & Maier, PLLC

(57) ABSTRACT

A display panel includes a display region and a non-display region connected to the display region. The display panel also includes a base, multiple light-emitting devices, an isolation layer, a bank, and a power wire. A light-emitting device includes a first electrode, a light-emitting function layer, and a second electrode stacked on the base. The isolation layer includes multiple isolation openings. The light-emitting function layer is located in a corresponding isolation opening. The bank is disposed in the non-display region. The projection of the bank on the base surrounds the display region. The power wire is electrically connected to the second electrode. The non-display region includes a first bezel region. The first bezel region includes a first side circuit region located between the bank and the display region. The power wire is disposed in at least part of the non-display region excluding the first side circuit region.

19 Claims, 4 Drawing Sheets

(58) Field of Classification Search
CPC ........... H10K 59/8051; H10K 59/8052; H10K 59/873; H10K 2102/351
See application file for complete search history.

(56) References Cited

U.S. PATENT DOCUMENTS

| | | | | |
|---|---|---|---|---|
| 2022/0209157 | A1 | 6/2022 | Lee et al. | |
| 2023/0081907 | A1* | 3/2023 | Lee | H10K 59/122 345/204 |
| 2023/0178007 | A1* | 6/2023 | Dai | H10D 86/451 345/55 |
| 2024/0284716 | A1* | 8/2024 | Yoo | H10K 59/1315 |

FOREIGN PATENT DOCUMENTS

| | | | | |
|---|---|---|---|---|
| CN | 113035927 | A | 6/2021 | |
| CN | 216749905 | U | 6/2022 | |
| CN | 114864639 | A | 8/2022 | |
| CN | 115295517 | A * | 11/2022 | H10D 86/60 |
| CN | 217768378 | U | 11/2022 | |
| CN | 115811913 | A | 3/2023 | |
| JP | 2008135325 | A | 6/2008 | |
| JP | 2013118074 | A | 6/2013 | |
| WO | WO-2018061195 | A1 * | 4/2018 | H05B 33/12 |
| WO | 2022050983 | A1 | 3/2022 | |

OTHER PUBLICATIONS

Office Action issued on Jan. 22, 2025, in corresponding Korean Application No. 10-2024-7019419, 13 pages.
Office Action issued on Aug. 19, 2025, in corresponding Japanese Application No. 2024-536468, 14 pages.
Office Action issued on Jan. 20, 2026, in corresponding Japanese Application No. 2024-536468, 14 pages.

* cited by examiner

DISPLAY PANEL AND DISPLAY DEVICE

CROSS-REFERENCE TO RELATED APPLICATIONS

This application is a continuation of International Patent Application No. PCT/CN2024/079801, filed on Mar. 4, 2024, which claims priority to Chinese Patent Application No. 202310771124.9 filed on Jun. 26, 2023, disclosures of both of which are incorporated herein by reference in their entireties.

TECHNICAL FIELD

Embodiments of the present application relate to the field of display technology, for example, a display panel and a display device.

BACKGROUND

With the development of display technology, narrow bezels become a development trend.

In the related art, a bezel circuit and multiple signal lines are disposed in the bezels of a display panel. The bezel circuit includes a gate driver circuit. The signal lines include cathode power signal lines, clock signal lines and so on. The cathode power signal lines are disposed around a display region.

However, in the existing display panel, it is difficult to implement a narrow bezel, and the screen-to-body ratio is relatively small.

SUMMARY

The present application provides a display panel and a display device.

In a first aspect, an embodiment of the present application provides a display panel. The display panel includes a display region and a non-display region connected to the display region. The display panel also includes a base, multiple light-emitting devices, an isolation layer, a bank, and a power wire. A light-emitting device includes a first electrode, a light-emitting function layer, and a second electrode stacked on the base. The isolation layer includes multiple isolation openings. The light-emitting function layer is located in a corresponding isolation opening. The bank and the isolation layer are disposed in the non-display region and located on the same side of the base. The projection of the bank on the base surrounds the display region. The power wire is electrically connected to the second electrode. The non-display region includes a first bezel region. The first bezel region includes a first side circuit region located between the bank and the display region. The power wire is disposed in at least part of the non-display region excluding the first side circuit region.

In a second aspect, an embodiment of the present application provides a display device. The display device includes the display panel according to the first aspect.

In the display panel and the display device provided by embodiments of the present application, the isolation layer is disposed in the display region. The isolation layer includes multiple isolation openings. The light-emitting function layer is located in an isolation opening. Thus, the isolation layer blocks the light-emitting function layers of adjacent light-emitting devices to ensure that crosstalk does not occur between the light-emitting devices. Moreover, the power wire is disposed in at least part of the non-display region excluding the first side circuit region, that is, the power wire is not disposed in the first side circuit region. Thus, the distance between the bank and the display region does not include the bezel width occupied by the power wire. Compared with the display panel of the related art, the distance between the bank and the display region may be reduced, so that the width of the first bezel region is reduced, thereby facilitating the implementation of a narrow bezel and increasing the screen-to-body ratio.

DETAILED DESCRIPTION

Figure 1:
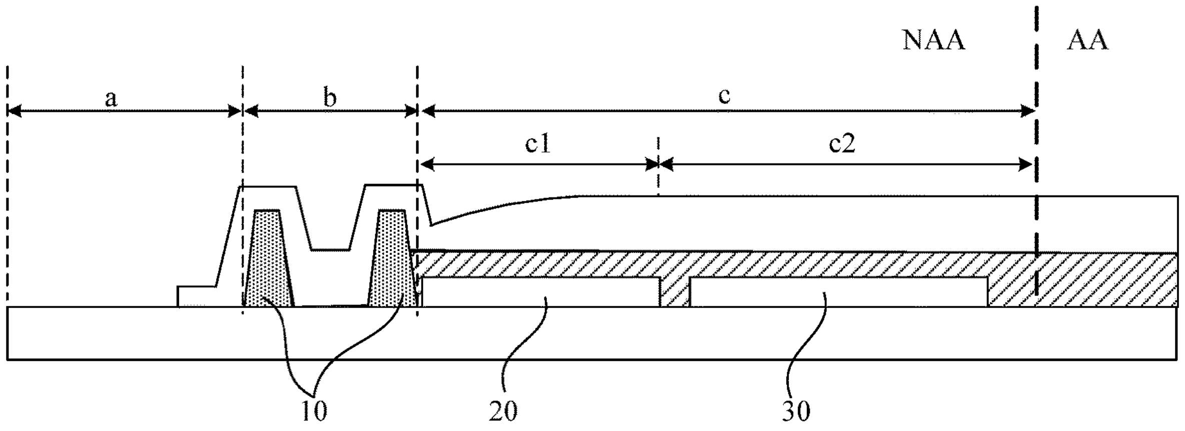
FIG. 1 is a diagram illustrating the structure of the bezel on a side of a display panel in the related art.

In the existing display panel, it is difficult to implement a narrow bezel, and the screen-to-body ratio is relatively small. The existing display panel includes multiple light-emitting devices, each of the light-emitting devices includes an anode, a light-emitting layer, and a cathode that are stacked, the cathodes of the multiple light-emitting devices are connected to each other to form a cathode layer, and the cathode layer is a whole surface structure. When the display panel is manufactured, after the light-emitting layer is formed, the cathode layer is laid on the whole surface on a side of the light-emitting layer. In the existing display panel, to ensure the display effect of the display panel, the cathode needs to be transparent. Thus, the thickness of the cathode layer is relatively thin and is generally about 100 angstroms so that the sheet resistance of the cathode layer is relatively large. Accordingly, when the cathode voltage is transmitted in the cathode layer, the voltage drop is relatively large. To alleviate the voltage drop of the cathode voltage, cathode power wires around the display region are usually disposed in the non-display region and the cathode power wires may be connected to the cathode layer at multiple positions around the display region. For example, for a rectangle display panel, on upper and lower bezels and left and right bezels of the display panel, the cathode power wires are connected to the cathode layer. FIG. 1 is a diagram illustrating the structure of the bezel on a side of a display panel in the related art. The bezel width of the display panel is equal to the sum of the distance between a bank and a display region (a first distance c in FIG. 1), the bezel width occupied by the bank (a second distance b in FIG. 1), and the distance between the bank and the edge of the display panel (a third distance a in FIG. 1). The distance between the bank and the display region (the first distance c in FIG. 1) includes the bezel width (a first width c1 in FIG. 1) occupied by the cathode power wires and the bezel width (a second width c2 in FIG. 1) occupied by a bezel circuit. The bezel short circuit may include a gate driver circuit. Thus, through research, the inventors find that the reason for the preceding problems is that, the cathode power wires are disposed as above so that the cathode power wires need to occupy multiple bezels of the display panel, which is not conducive to the implementation of a narrow bezel.

Figure 2:
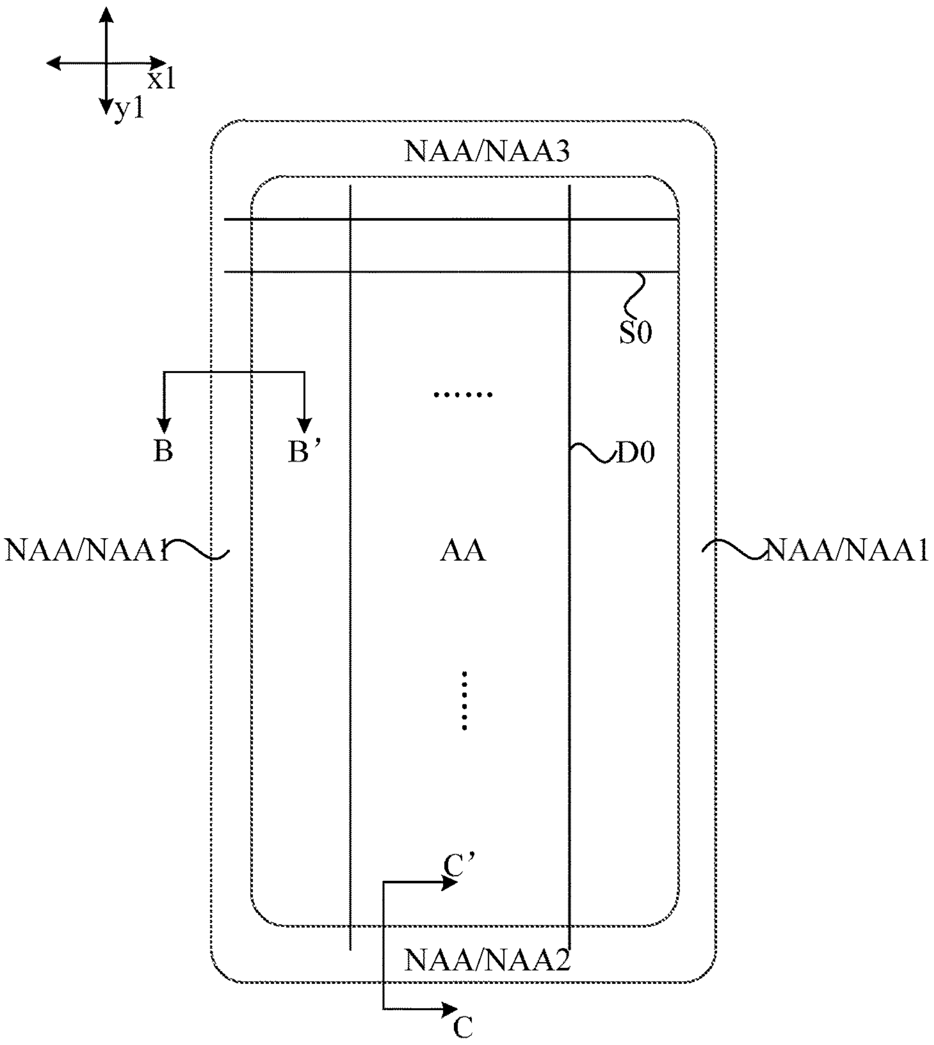
FIG. 2 is a top view of a display panel according to an embodiment of the present application.
Figure 3:
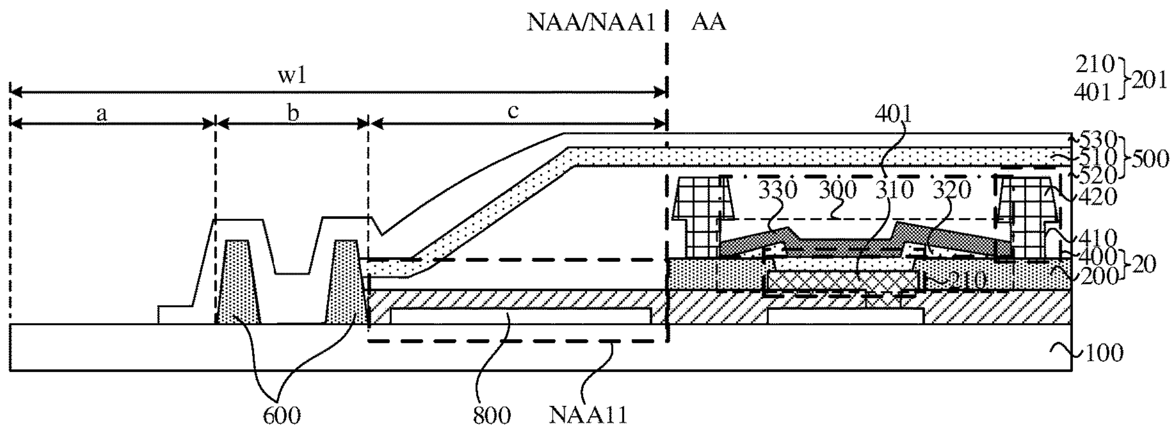
FIG. 3 is a section view of a display panel according to an embodiment of the present application.
Figure 4:
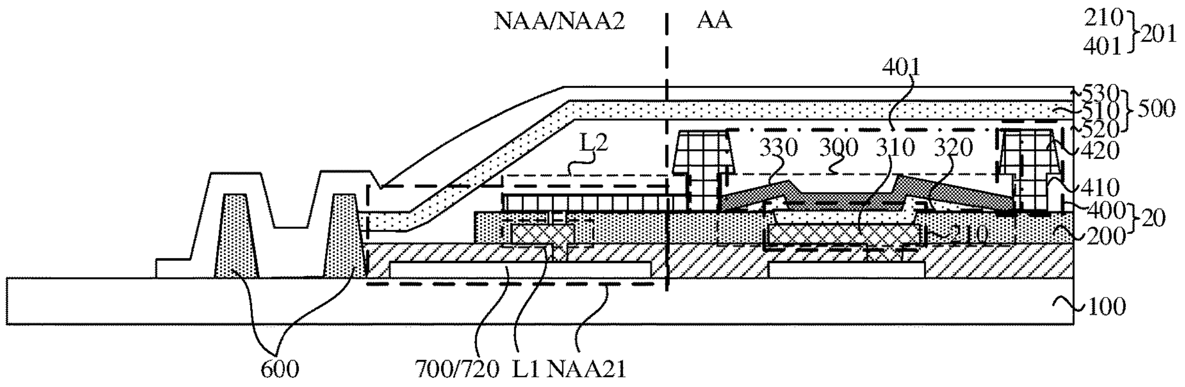
FIG. 4 is a section view of another display panel according to an embodiment of the present application.

An embodiment of the present application provides a display panel. FIG. 2 is a top view of a display panel according to an embodiment of the present application. FIG. 3 is a section view of a display panel according to an embodiment of the present application. FIG. 4 is a section view of another display panel according to an embodiment of the present application. FIG. 3 may be obtained by sectioning along section line BB' of FIG. 2. FIG. 4 may be obtained by sectioning along section line CC' of FIG. 2. Referring to FIGS. 2 to 4, the display panel includes a display region AA and a non-display region NAA connected to the display region AA. The display panel also includes a base 100, multiple light-emitting devices 300, an isolation layer 20, a thin-film encapsulation layer 500, a bank 600, and a power wire 700. The light-emitting device 300 includes a first electrode 310, a light-emitting function layer 320, and a second electrode 330 stacked on the base 100. The isolation layer 20 includes multiple isolation openings 201. The light-emitting function layer 320 of a light-emitting device is located in an isolation opening 201 corresponding to the light-emitting device. The isolation layer 20 is configured to block the light-emitting function layers 320 of adjacent light-emitting devices 300. The thin-film encapsulation layer 500 at least covers multiple light-emitting devices 300. The thin-film encapsulation layer 500 at least includes an organic encapsulation layer 510. The bank 600 is disposed in the non-display region NAA, the bank 600 and the isolation layer 20 are located on the same side of the base 100. The projection of the bank 600 on the base surrounds the display region AA. The bank 600 is configured to block the organic encapsulation layer 510. The power wire 700 is electrically connected to the second electrode 330. The non-display region NAA includes a first bezel region NAA1. The first bezel region NAA1 includes a first side circuit region NAA11 located between the bank 600 and the display region AA. The power wire 700 is disposed in at least part of the non-display region NAA excluding the first side circuit region NAA11 (that is, the power wire 700 is disposed in the non-display region NAA but not disposed in the first side circuit region NAA11).

The base 100 may cushion, protect, or support the display device. The base 100 may be a flexible base. The material of the flexible base 100 may be polyimide (PI), polyethylene naphthalate (PEN), or polyethylene terephthalate (PET), or may be a mixed material of the preceding multiple materials. The base 100 may also be a hard base made of glass or other materials.

In some optional embodiments of the present application, the isolation layer 20 also includes a pixel defining layer 200 and an isolation structure 400. The pixel defining layer 200 is disposed on a side of the base 100 of the display panel. The isolation structure 400 is disposed on a side of the pixel defining layer 200 facing away from the base 100. The isolation structure 400 is enclosed to form a first opening 401. The pixel defining layer 200 is enclosed to form a second opening 210. The orthographic projection of the second opening 210 on the base 100 is in the orthographic projection of the first opening 401 on the base 100. An isolation opening 201 includes a first opening 401 and a second opening 210. The light-emitting function layer 320 is at least partially located in the second opening 210.

The orthographic projection of the second opening 210 on the base 100 is in the orthographic projection of the first opening 401 on the base 100, including the case where the orthographic projection of the second opening 210 on the base 100 completely overlaps the orthographic projection of the first opening 401 on the base 100, the orthographic projection of the second opening 210 on the base 100 partially overlaps the orthographic projection of the first opening 401 on the base 100, and the orthographic projection of the second opening 210 on the base 100 is completely covered in the orthographic projection of the first opening 401 on the base 100.

The pixel defining layer 200 includes multiple second openings 210. Each of the multiple second openings 210 is provided with the light-emitting function layer 320 of a light-emitting device 300. The pixel defining layer 200 may be made of organic materials such as an acrylic organic compound, polyamide, or polyimide, or may be made of inorganic materials such as silicon oxide, silicon nitride, silicon oxynitride, or aluminum oxide. This is not limited in this embodiment of the present application.

A light-emitting device 300 includes a first electrode 310, a light-emitting function layer 320, and a second electrode 330 stacked on the base 100. Optionally, the first electrode 310 is the anode of the light-emitting device 300. The second electrode 330 is the cathode of the light-emitting device 300. The anode may use a three-layer structure. The first layer and the third layer may be metal-oxide layers, such as indium tin oxide (ITO), indium zinc oxide (IZO), and aluminum zinc oxide (AZO), and the middle second layer may be a metal layer (such as silver or copper). The first electrode 310 is connected to a pixel circuit and receives a drive signal from the pixel circuit. The cathode may be an ITO transparent electrode or magnesium-silver alloy. The light-emitting function layer 320 may include a single film, that is, only a light-emitting material layer. The light-emitting function layer 320 may also include a multi-layer structure formed by a hole injection layer, a hole transport layer, a light-emitting material layer, an electron transport layer, and an electron injection layer stacked on a side of the base 100. Moreover, the light-emitting function layer 320 at least includes a red light-emitting layer, a green light-emitting layer, and a blue light-emitting layer, so that display of multiple colors can be implemented.

The isolation structure 400 is located in the display region AA. The light-emitting function layer 320 of the light-emitting device 300 is isolated by the isolation structure 400, so that the cross-color between different light-emitting devices 300 may be avoided. The isolation structure 400 has a certain thickness, and the thickness of the isolation structure 400 is greater than the thickness of the cathode. For example, when the display panel is prepared, after the isolation structure 400 is prepared, the isolation structure 400 is used as a mask for evaporating a light-emitting layer, and further, the light-emitting function layers 320 of the adjacent light-emitting devices 300 are separated at the isolation structure 400 by the isolation structure 400. The light-emitting function layer 320 is not in contact with the isolation structure 400 to avoid the cross-color of different colors emitted by adjacent light-emitting devices 300. Moreover, the use of a precise mask for evaporating the light-emitting function layer 320 in the related art may be saved. When the cathode is prepared on the light-emitting function layer 320, for example, a universal mask is used to evaporate the cathode, due to the existence of the isolation structure 400, the cathode is isolated into multiple independent cathodes that correspond to light-emitting devices 300 in a one-to-one manner. The preparation process of a cathode is not limited to the evaporation process as mentioned above, and a sputtering process or other processes may also be used. This is not limited in this embodiment. It is to be noted that when the light-emitting function layer 320 and the cathode 330 are prepared by using the evaporation process, the evaporation angle is adjusted to be different, so that the light-emitting function layer 320 is not in contact with the isolation structure 400 and the cathode 300 is in contact with the isolation structure 400 to implement the connection between the two.

Further referring to FIGS. 3 and 4, the display panel also includes a thin-film encapsulation layer 500. Optionally, the thin-film encapsulation layer 500 includes a first inorganic encapsulation layer 520, an organic encapsulation layer 510, and a second inorganic encapsulation layer 530 that are stacked to ensure a better encapsulation effect. The thin-film encapsulation layer 500 at least covers multiple light-emitting devices 300. The thin-film encapsulation layer 500 may also cover at least part of circuit structures and signal lines in the non-display region NAA to encapsulate the light-emitting device 300 and the circuit structures in the display panel and prevent the light-emitting device 300 and a circuit device from being corroded by water and oxygen, thereby ensuring that the display panel has relatively long service life.

The material of the organic encapsulation layer 510 is an organic material, and the organic material has fluidity. To block the organic encapsulation layer 510, the display panel also includes a bank 600. The bank 600 is disposed in the non-display region NAA. The projection of the bank 600 on the base surrounds the display region AA. The bank 600 is configured to block the organic encapsulation layer 510. The bank 600 and the pixel defining layer 200 are located on the same side of the base 100. Optionally, the part of the pixel defining layer 200 in the non-display region NAA may be at least partially used as the structure of the bank 600.

Referring to FIG. 4, the display panel also includes a power wire 700. The power wire 700 is electrically connected to the isolation structure 400 and the second electrode 330. The power wire 700 may be connected to the second electrode 330 through the isolation structure 400 or may be connected to the isolation structure 400 through the second electrode 330. The power wire 700 may be connected to a power supply that outputs the voltage required by the second electrode 330 and then transmits the voltage output by the power supply to the second electrode 330. Referring to FIGS. 2 to 4, in this embodiment, the non-display region NAA includes a first bezel region NAA1. The first bezel region NAA1 includes a first side circuit region NAA11 between the bank 600 and the display region AA. The power wire 700 is disposed in the non-display region NAA and the power wire 700 is disposed in at least partial regions in the non-display region NAA excluding the first side circuit region NAA11. The display region may include multiple bezel regions. The multiple bezel regions may include at least one first bezel region NAA1. The multiple bezel regions may also include other bezel regions excluding the first bezel region NAA1. FIG. 2 and FIG. 4 schematically illustrate the case where the display panel also includes a second bezel region NAA2, and the power wire 700 is located in the second bezel region NAA2 of the display panel. The second bezel region NAA2 is a bezel region different from the first bezel region NAA1 in the display panel. In some optional embodiments, the first bezel region NAA1 partially overlaps the second bezel region NAA2. For example, both the first bezel region NAA1 and the second bezel region NAA2 include a lower left corner region and a lower right corner region of the display panel. In this case, the first bezel region NAA1 partially overlaps the second bezel region NAA2. In the other optional embodiments, the first bezel region NAA1 does not overlap the second bezel region NAA2. For example, one of the first bezel region NAA1 or the second bezel region NAA2 includes a lower left corner region and a lower right corner region of the display panel, and the other of the first bezel region NAA1 or the second bezel region NAA2 does not include the lower left corner region and the lower right corner region of the display panel. In this case, the first bezel region NAA1 does not overlap the second bezel region NAA2. However, regardless of whether the first bezel region NAA1 overlaps the second bezel region NAA2, the first bezel region NAA1 and the second bezel region NAA2 are different bezel regions.

Further referring to FIG. 3, optionally, the first side circuit region NAA11 is provided with a gate driver circuit 800. The gate driver circuit 800 includes a scan circuit configured to generate a scan signal and/or a light-emitting control circuit configured to generate a light-emitting control signal.

The output terminal of the scan circuit is connected to a scan line S0. The scan circuit may output the scan signal to the scan line S0. The display panel also includes a light-emitting control signal line. The output terminal of the light-emitting control circuit is connected to the light-emitting control signal line. The light-emitting control circuit may output the light-emitting control signal to the light-emitting control signal line. The display panel includes a pixel circuit configured to drive the light-emitting device 300 to emit light. The pixel circuit is connected to the scan line S0 and the light-emitting control signal line respectively and drives the light-emitting device 300 according to the scan signal transmitted by the scan line S0 and the light-emitting control signal transmitted by the light-emitting control signal line.

As shown in FIG. 3, the bezel width w1 corresponding to the first bezel region NAA1 in the display panel is equal to the sum of the distance between the bank 600 and the display region AA (a first distance c in FIG. 3), the bezel width occupied by the bank 600 (a second distance b in FIG. 3), and the distance between the bank 600 and the edge of the display panel (a third distance a in FIG. 3). In conjunction with FIGS. 3 and 4, in this embodiment, the power wire 700 is disposed in at least part of regions in the non-display region NAA excluding the first side circuit region NAA11, that is, the power wire 700 is not disposed in the first side circuit region NAA11. In this manner, the distance between the bank 600 and the display region AA (the first distance c in FIG. 3) does not include the bezel width occupied by the power wire 700. When the first side circuit region NAA11 is provided with a gate driver circuit 800, the first side circuit region NAA11 includes the bezel width occupied by the gate driver circuit 800 and does not include the bezel width occupied by the power wire 700. Compared with the display panel shown in FIG. 1 where the distance between the bank 600 and the display region AA (the first distance c in FIG. 1) includes the bezel width (a first width c1 in FIG. 1) occupied by a cathode power wire and the bezel width (a second width c2 in FIG. 1) occupied by the bezel circuit (may be a gate drive circuit), so that the distance between the bank 600 and the display region AA is reduced, and the width of the first bezel region NAA1 is reduced, thereby facilitating the implementation of a narrow bezel.

In this embodiment, since the isolation structure 400 is disposed in the display region AA, optionally, the isolation structure 400 is connected to the second electrodes 330 of at least part of the light-emitting devices 300 in the display panel. The second electrodes 330 of multiple light-emitting devices 300 in the display panel may be connected to each other through the isolation structure 400. The display panel may also include a conductive connection layer different from the layer where the isolation structure 400 is located. The conductive connection layer is connected to the second electrodes 330 of multiple light-emitting devices 300. A material having lower resistivity relative to the second electrode 330 is selected as the material of the isolation structure 400 (or the conductive connection layer), and/or the thickness of the isolation structure 400 (or the conductive connection layer) is thickened, so that the overall structure that connects the second electrode 330 to the isolation structure 400 (or the conductive connection layer) may have a smaller resistance than the entire cathode layer in the related art, and a voltage drop is relatively small when the voltage required by the second electrode 330 in the display region AA is transmitted. In this embodiment, the power wires 700 may be reduced in the non-display region NAA, and a power wire 700 may no longer be disposed in the side circuit region of the first bezel region NAA1, thereby facilitating the implementation of a narrow bezel.

In the display panel of this embodiment, the isolation layer is disposed in the display region. The isolation layer includes multiple isolation openings. The light-emitting function layer is located in an isolation opening. Thus, the isolation layer blocks the light-emitting function layers of adjacent light-emitting devices to ensure that crosstalk does not occur between the light-emitting devices. The power wire is disposed in at least part of regions in the non-display region excluding the first side circuit region, that is, the power wire is not disposed in the first side circuit region. Thus, the distance between the bank and the display region does not include the bezel width occupied by the power wire. Compared with the display panel of the related art, the distance between the bank and the display region can be reduced, so that the width of the first bezel region is reduced, thereby facilitating the implementation of a narrow bezel and increasing the screen-to-body ratio.

Further referring to FIGS. 2 to 4, on the basis of the preceding technical solutions, the display panel also includes a scan line S0 and a data line DO. The scan line S0 extends in a first direction x1. The data line DO extends in a second direction y1. The first direction x1 intersects the second direction y1. The non-display region NAA includes two first bezel regions NAA1 opposite to each other in the first direction x1. The non-display region NAA further includes a second bezel region NAA2. In the second direction y1, the second bezel region NAA2 is located on a side of the display region AA. The power wire 700 is at least partially disposed in the second bezel region NAA2.

When the display panel is the rectangle display panel shown in FIG. 2, two first bezel regions NAA1 of the display panel are a left bezel and a right bezel of the display panel respectively. The second bezel region NAA2 of the display panel is the lower bezel of the display panel. The non-display region NAA also includes a third bezel region NAA3 opposite to the second bezel region NAA2 in the second direction y1. The third bezel region NAA3 of the display panel is the upper bezel of the display panel. In this embodiment, power wires 700 are not disposed in the first side circuit regions NAA11 of the two first bezel regions NAA1 opposite to each other in the first direction x1 of the display panel, so that the widths of the two first bezel regions NAA1 opposite to each other in the first direction x1 are relatively narrow. Thus, it is more conducive to the implementation of a narrow bezel, and the widths of the two first bezel regions NAA1 may be more consistent, so that the aesthetics of the display panel is ensured, and the visual experience of a user is improved.

Optionally, the second bezel region NAA2 includes a second side circuit region NAA21 between the bank 600 and the display region AA. The power wire 700 is at least partially disposed in the second side circuit region NAA21. The second bezel region NAA2 is provided with a driver chip (not shown) for providing a data signal.

Since the second bezel region NAA2 needs to be provided with a driver chip to output a data signal to the data line DO, so that the second bezel region NAA2 has a certain width. The voltage required by the second electrode 330 may be provided by the driver chip. In this case, the power wire 700 is disposed in the second side circuit region NAA21, so that it is convenient to lead the voltage required by the second electrode 330 output by the driver chip to the isolation structure 400 and the second electrode 330 in the display region AA, and the length of the power wire 700 does not need to be excessively long, thereby facilitating the implementation of a narrow bezel. The voltage required by the second electrode 330 may also be provided by an additional power supply. The additional power supply is generally disposed in the same bezel region (that is, the second bezel region NAA2) as the driver chip or bent to the backlight side of the display panel. In this case, the power wire 700 is disposed in the second side circuit region NAA21, so that is also convenient to lead the voltage required by the second electrode 330 output by the driver chip to the isolation structure 400 and the second electrode 330 in the display region AA, and the length of the power wire 700 does not need to be excessively long, thereby facilitating the implementation of a narrow bezel.

It is to be noted that in some optional embodiments of the present application, the power wire 700 may all be disposed in the second bezel region NAA2, so that except for the second bezel region NAA2, the widths of other bezel regions may be reduced. Thus, the display panel may implement a narrow bezel.

In the other optional embodiments of the present application, a power wire may be partially disposed in the second bezel region NAA2 and partially disposed in other bezel regions.

Figure 5:
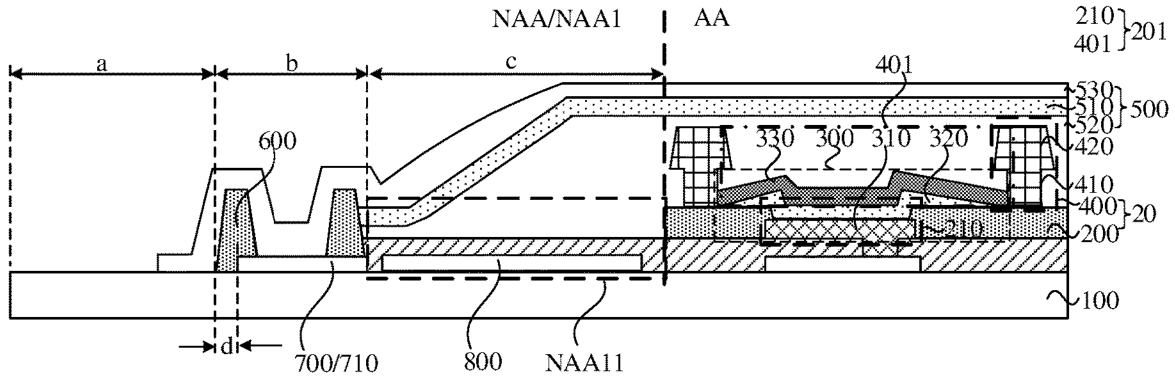
FIG. 5 is a section view of another display panel according to an embodiment of the present application.

FIG. 5 is a section view of another display panel according to an embodiment of the present application. FIG. 5 may be obtained by sectioning along section line BB' of FIG. 2. In combination with FIGS. 2, 4, and 5, optionally, in the first bezel region NAA1, the power wire 700 includes a first wire portion 710 disposed between the bank 600 and the base 100. The orthographic projection of the first wire portion 710 on the base 100 is covered by the orthographic projection of the bank 600 on the base 100.

The power wire 700 also includes a second wire portion 720 disposed in the second bezel region NAA2. The first wire portion 710 is connected to the second electrode 330 through the second wire portion 720. Optionally, the first wire portion 710 is connected to the isolation structure 400 and the second electrode 330 through the second wire portion 720.

Since the disposition of the bank 600 needs to occupy a bezel, in this embodiment, the first wire portion 710 of the power wire 700 is disposed between the bank 600 and the base 100. The orthographic projection of the first wire portion 710 on the base 100 is covered by the orthographic projection of the bank 600 on the base 100. Thus, the first wire portion 710 does not additionally occupy the bezel of the display panel relative to the bank 600. Then, on the one hand, the power wire 700 can be disposed in the first bezel region NAA1, so that it is beneficial to alleviate the voltage drop when the voltage required by the second electrode 330 is transmitted. On the other hand, the width of the first bezel region NAA1 can be made narrower, thereby facilitating the implementation of a narrow bezel.

Further referring to FIG. 5, optionally, the distance (a fourth distance d in FIG. 5) between the edge of the first wire portion 710 facing away from the display region AA and the edge of the bank 600 facing away from the display region AA is greater than 0.

The bank 600 is disposed, so that the thin-film encapsulation layer 500 forms an undulating curved surface at the position of the bank 600, which may extend the invasion path of water and oxygen. The bank 600 may also block water and oxygen. The orthographic projection of the first wire portion 710 on the base 100 is covered by the orthographic projection of the bank 600 on the base 100, and the distance between the edge of the first wire portion 710 facing away from the display region AA and the edge of the bank 600 facing away from the display region AA is greater than 0. Thus, the first wire portion 710 is prevented from extending beyond the bank 600, so that the first wire portion 710 is not easily invaded by water and oxygen. In this manner, the signal transmission performance of the first wire portion 710 is ensured, thereby ensuring a good display effect of the display panel.

Referring to FIGS. 4 and 5, in some optional embodiments of the present application, the power wire 700 and the conductive structure in the display panel are made of the same material and disposed in the same layer and are prepared simultaneously by using the same process, so that the object of saving a preparation process may be achieved. For example, the power wire 700 may be made of the same material as the source and drain of the transistor included in the pixel circuit in the display panel and be disposed on the same layer and are prepared simultaneously by using the same process. As shown in FIG. 5, the power wire 700 may be connected to the isolation structure 400 through a first connection structure L1 on the same layer as the first electrode 310 in the non-display region NAA and a second connection structure L2 on the same layer as the isolation structure 400 in the non-display region NAA.

Figure 6:
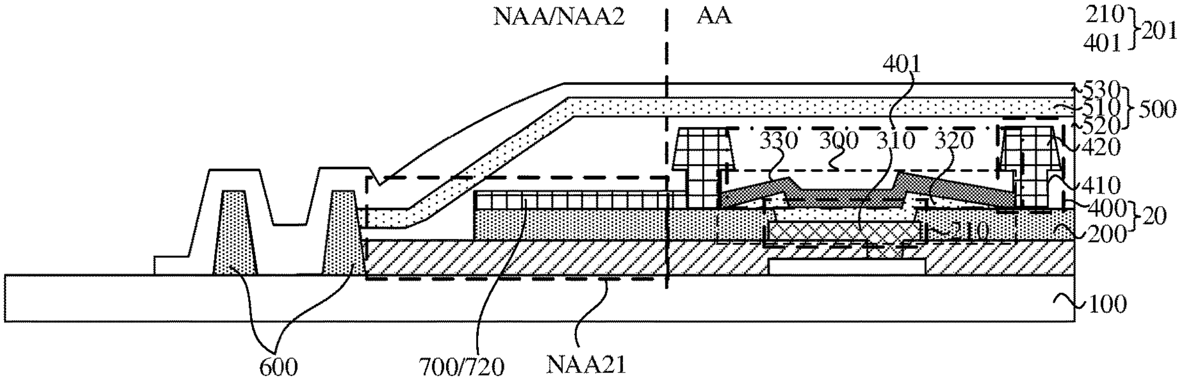
FIG. 6 is a section view of another display panel according to an embodiment of the present application.

FIG. 6 is a section view of another display panel according to an embodiment of the present application. FIG. 6 may be obtained by sectioning along section line CC' of FIG. 2. In the other optional embodiments of the present application, the power wire 700 and the isolation structure 400 are made of the same material and disposed in the same layer and are prepared simultaneously by using the same process. Thus, a preparation process may be saved, so that the preparation process of the display panel is relatively simplified. Moreover, the connection between the power wire 700 and the isolation structure 400 does not need to be bridged through other connection structures, and the connection between the two is more easily implemented.

Figure 7:
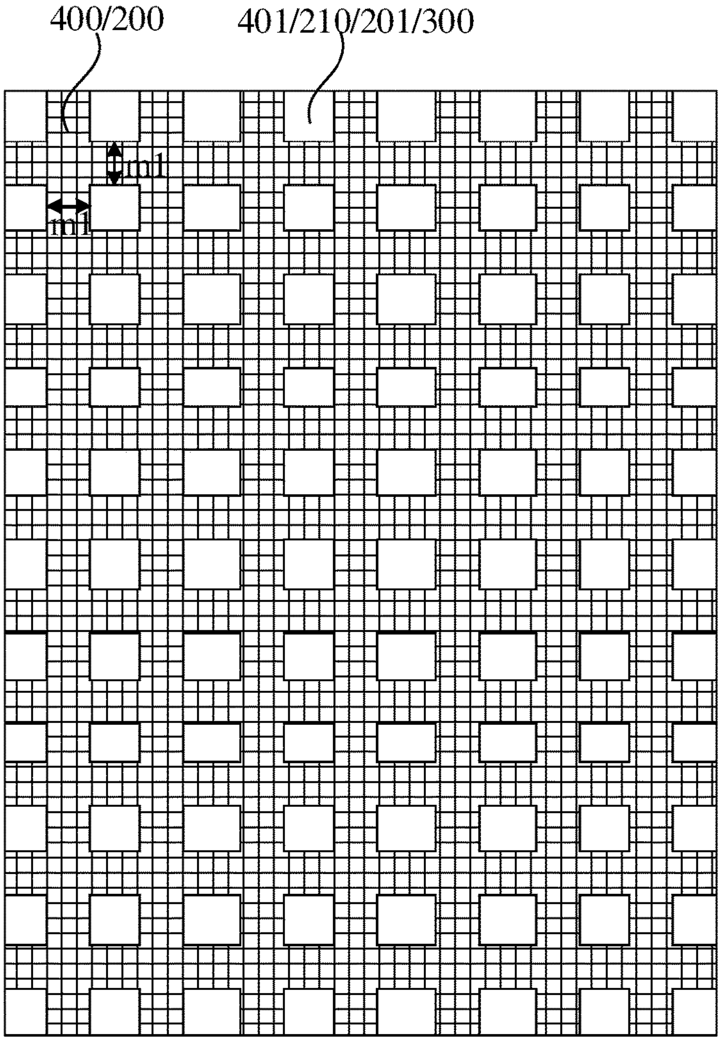
FIG. 7 is a top view of another display panel according to an embodiment of the present application.

FIG. 7 is a top view of another display panel according to an embodiment of the present application. Further referring to FIGS. 3 to 7, optionally, the orthographic projection of the isolation structure 400 on the pixel defining layer 200 is located between adjacent second openings 210. The isolation structure 400 includes a support portion 410 and a blocking portion 420. The support portion 410 is located between the blocking portion 420 and the pixel defining layer 200. The orthographic projection of the blocking portion 420 on the pixel defining layer 200 covers the orthographic projection of the support portion 410 on the pixel defining layer 200. A second electrode 330 of a light-emitting device 300 on at least one side of the isolation structure 400 is connected to the support portion 410 of the isolation structure 400. The support portion 410 is electrically conductive.

The material of the support portion 410 may be a conductive material. The second electrodes 330 of adjacent light-emitting devices 300 are all connected to the support portion 410, so that the second electrodes 330 of adjacent light-emitting devices 300 are electrically connected through the support portion 410. The material of the support portion 410 may be aluminum and/or copper. The material of the blocking portion 420 may include a conductive material and/or an insulating material, for example, the material of the blocking portion 420 includes titanium, silicon nitride, or silicon oxide.

Figure 8:
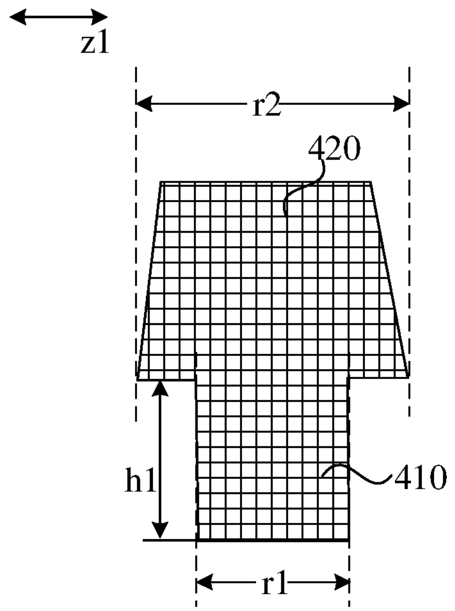
FIG. 8 is an enlarged view of an isolation structure according to an embodiment of the present application.

FIG. 8 is an enlarged view of an isolation structure according to an embodiment of the present application. In conjunction with FIGS. 3 to 8, optionally, in a direction z1 of the connecting line of second openings 210 on two sides of the isolation structure 400, at the position in which the support portion 410 is connected to the blocking portion 420, the size r1 of the support portion 410 is smaller than the size r2 of the blocking portion 420.

In the direction z1 of the connecting line of the second openings 210 on the two sides of the isolation structure 400, at the position in which the support portion 410 is connected to the blocking portion 420, the size r1 of the support portion 410 is smaller than the size r2 of the blocking portion 420. Thus, an undercut structure is formed on the side of the isolation structure 400, and when the light-emitting layer of the light-emitting device 300 in the display panel is evaporated, the light-emitting layers of the adjacent light-emitting devices 300 may be cut off at the position of the isolation structure 400. In addition, the second electrode 330 of the light-emitting device 300 may also be formed by using an evaporation process. An evaporation angle is controlled to be different when the second electrode 330 and the light-emitting layer are evaporated, so that the second electrode 330 may be connected to the support portion 410 of the isolation structure 400. Then, the second electrodes 330 of the multiple light-emitting devices 300 in the display panel may be connected to each other through the isolation structure 400.

It is to be noted that in this embodiment, the shape of the isolation structure 400 is not limited to the shape shown in FIG. 8, as long as the shape of the isolation structure 400 satisfies the requirement that the light-emitting function layer of the light-emitting device 300 is blocked, and at the position in which the support portion 410 is connected to the blocking portion 420, the size r1 of the support portion 410 is smaller than the size r2 of the blocking portion 420.

Further referring to FIGS. 3 to 6, on the basis of multiple preceding embodiments, optionally, the thickness h1 of the support portion 410 is greater than the thickness h2 of the second electrode 330. Thus, when the light-emitting function layer 320 and the second electrode 330 are prepared, the light-emitting function layers 320 of adjacent light-emitting devices 300 may be more easily isolated by the isolation structure 400, and the second electrodes 330 of adjacent light-emitting devices 300 may also be more easily isolated by the isolation structure 400. In this manner, it is more conducive to avoid the cross-color of adjacent light-emitting devices 300. Moreover, the thickness of the support portion 410 is relatively thick, so that the sheet resistance of the isolation structure 400 is smaller. Thus, the transmission voltage drop of the required voltage of the second electrode 330 in the display region AA is smaller.

Optionally, the thickness of the support portion 410 is greater than or equal to 5000 angstroms. For example, the thickness of the support portion 410 may be equal to 5000 angstroms, may be equal to 5500 angstroms, or may be equal to 6000 angstroms. The thickness of the support portion 410 is greater than or equal to 5000 angstroms, so that the support portion 410 may have a relatively thick thickness, thereby ensuring that the support portion 410 may isolate the light-emitting function layer 320 and the support portion 410 has a relatively small sheet resistance.

In some optional embodiments of the present application, the thickness of the support portion 410 is smaller than or equal to 8000 angstroms, so that in addition to ensuring the isolation effect of the support portion 410 on the light-emitting function layer 320 and a relatively small sheet resistance, the thickness of the display panel does not increase significantly due to the disposition of the isolation structure 400, and it is ensured that the display panel is light and thin.

Further referring to FIGS. 3 to 7, optionally, in the display region AA, the orthographic projection of the isolation structure 400 on the base 100 overlaps the orthographic projection of the pixel defining layer 200 on the base 100. The orthographic projection of the first opening 401 on the base 100 completely overlaps the orthographic projection of the second opening 210 on the base 100.

The orthographic projection of the isolation structure 400 on the base 100 overlaps the orthographic projection of the pixel defining layer 200 on the base 100. That is, the isolation structure 400 is correspondingly disposed in other regions except for the region corresponding to the second opening 210 formed by the pixel defining layer 200. With this disposition, on the one hand, it can be ensured that the isolation structure 400 has a relatively large cross-section area, so that the resistance of the isolation structure 400 is relatively small, and further, the resistance of the overall structure formed by connecting the isolation structure 400 and the second electrode 330 is small relatively. Thus, the transmission voltage drop of the voltage required by the second electrode 330 is small relatively. On the other hand, when the light-emitting function layer 320 is evaporated, the light-emitting function layer 320 is isolated by the isolation structure 400 and is limited in the second opening 210 formed by the pixel defining layer 200, thereby ensuring the performance of the light-emitting device 300.

Further referring to FIG. 7, optionally, the distance ml between adjacent second openings 210 is greater than or equal to 3 microns.

The distance ml between adjacent second openings 210 is greater than or equal to 3 microns, so that the cross-section area of the isolation structure 400 on the side of the pixel defining layer 200 far away from the base 100 may be relatively large. Thus, the resistance of the isolation structure 400 is relatively small, and further, the resistance of the overall structure formed by connecting the isolation structure 400 and the second electrode 330 is small relatively. Moreover, the transmission voltage drop of the voltage required by the second electrode 330 is small relatively, and the power wires 700 in the non-display region NAA may be reduced, thereby facilitating the implementation of a narrow bezel.

Figure 9:
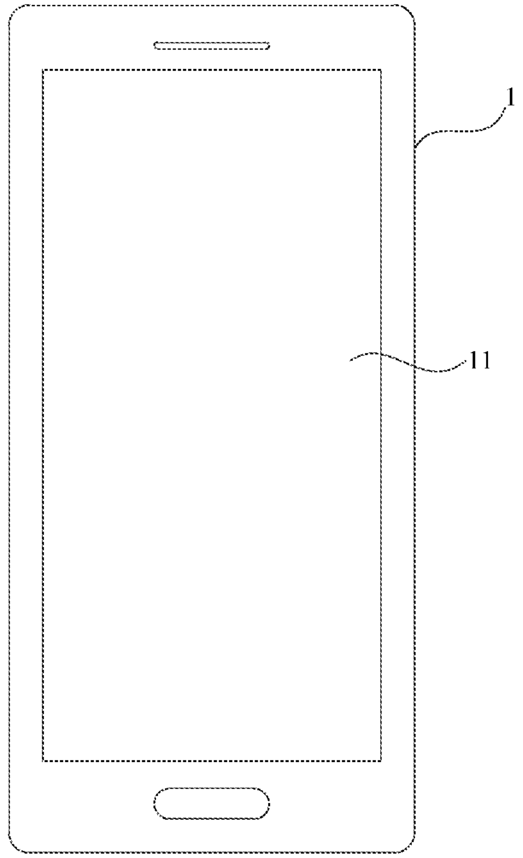
FIG. 9 is a diagram illustrating the structure of a display device according to an embodiment of the present application.

An embodiment of the present application provides a display device. FIG. 9 is a diagram illustrating the structure of a display device according to an embodiment of the present application. Referring to FIG. 9, the display device 1 provided by this embodiment of the present application includes the display panel 11 provided by any preceding embodiment of the present application. The display device may be a mobile phone as shown in FIG. 9, may be a computer, a television, an intelligent wearable display device and the like, and is not specifically limited in this embodiment of the present application.

It is to be noted that the above are only preferred embodiments of the present application and the principles used therein. It will be understood by those skilled in the art that the present application is not limited to the specific embodiments described herein. Those skilled in the art can make various apparent variations, adaptions, and substitutions without departing from the scope of the present application. Therefore, while the present application has been described in detail via the preceding embodiments, the present application is not limited to the preceding embodiments and may include more other equivalent embodiments without departing from the concept of the present application. The scope of the present application is determined by the scope of the appended claims.

What is claimed is:

1. A display panel, comprising a display region and a non-display region connected to the display region;

the display panel further comprises:

a base;

a plurality of light-emitting devices, the light-emitting device comprising a first electrode, a light-emitting function layer, and a second electrode stacked on the base;

an isolation layer, comprising a plurality of isolation openings, wherein the light-emitting function layer is located in a corresponding isolation opening of the plurality of isolation openings;

a bank, disposed in the non-display region, the bank and the isolation layer being located on a same side of the base, wherein a projection of the bank on the base surrounds the display region; and a power wire, electrically connected to the second electrode, wherein the non-display region comprises a first bezel region, the first bezel region comprises a first side circuit region located between the bank and the display region, and the power wire is disposed in at least part of the non-display region excluding the first side circuit region;

wherein the isolation layer further comprises an isolation structure, the power wire and the isolation structure are made of a same material and disposed in a same layer and are prepared simultaneously by using a same process.

2. The display panel according to claim 1, wherein the first electrode is an anode of the one light-emitting device, and the second electrode is a cathode of the one light-emitting device.

3. The display panel according to claim 1, wherein the isolation layer further comprises a pixel defining layer; and the pixel defining layer is disposed on a side of the base of the display panel, and the isolation structure is disposed on a side of the pixel defining layer facing away from the base; the isolation structure is enclosed to form a first opening, the pixel defining layer is enclosed to form a second opening, and an orthographic projection of the second opening on the base is in an orthographic projection of the first opening on the base; one of the plurality of isolation openings comprises the first opening and the second opening; and the light-emitting function layer is at least partially located in the second opening.

4. The display panel according to claim 3, wherein second electrodes of at least part of the plurality of light-emitting devices are connected to the isolation structure, and the isolation structure is electrically conductive.

5. The display panel according to claim 1, further comprising a thin-film encapsulation layer at least covering the plurality of light-emitting devices, wherein the thin-film encapsulation layer at least comprises an organic encapsulation layer, and the bank is configured to block the organic encapsulation layer.

6. The display panel according to claim 1, further comprising a scan line and a data line, wherein the scan line extends in a first direction, the data line extends in a second direction intersecting with the first direction;

the non-display region comprises two first bezel regions opposite to each other in the first direction; and the non-display region further comprises a second bezel region, and in the second direction, the second bezel region is located on a side of the display region; and the power wire is at least partially disposed in the second bezel region.

7. The display panel according to claim 6, wherein the second bezel region comprises a second side circuit region between the bank and the display region, the power wire is at least partially disposed in the second side circuit region, and the second bezel region is further provided with a driver chip for providing a data signal.

8. The display panel according to claim 6, wherein the first side circuit region is provided with a gate driver circuit, and the gate driver circuit comprises at least one of the following: a scan circuit configured to generate a scan signal, a light-emitting control circuit configured to generate a light-emitting control signal.

9. The display panel according to claim 6, wherein the non-display region further comprises a third bezel region opposite to the second bezel region in the second direction.

10. The display panel according to claim 6, wherein a bezel width corresponding to the first bezel region in the display panel is equal to a sum of a distance between the bank and the display region, a bezel width occupied by the bank, and a distance between the bank and an edge of the display panel.

11. The display panel according to claim 6, wherein in the first bezel region, the power wire comprises a first wire portion disposed between the bank and the base; and an orthographic projection of the first wire portion on the base is covered by an orthographic projection of the bank on the base; and the power wire further comprises a second wire portion disposed in the second bezel region, and the first wire portion is connected to the second electrode through the second wire portion.

12. The display panel according to claim 11, wherein a distance between an edge of the first wire portion facing away from the display region and an edge of the bank facing away from the display region is greater than 0.

13. The display panel according to claim 3, wherein an orthographic projection of the isolation structure on the pixel defining layer is located between adjacent second openings;

the isolation structure comprises a support portion and a blocking portion, and the support portion is located between the blocking portion and the pixel defining layer; an orthographic projection of the blocking portion on the pixel defining layer covers an orthographic projection of the support portion on the pixel defining layer; and a second electrode of a light-emitting device on at least one side of the isolation structure is connected to the support portion of the isolation structure, and the support portion is electrically conductive.

14. The display panel according to claim 13, wherein in a direction of a connecting line of the two adjacent second openings on opposite sides of the isolation structure, at a position in which the support portion is connected to the blocking portion, a size of the support portion is smaller than a size of the blocking portion.

15. The display panel according to claim 13, wherein a thickness of the support portion is greater than a thickness of the second electrode.

16. The display panel according to claim 15, wherein a thickness of the support portion is greater than or equal to 5000 angstroms.

17. The display panel according to claim 3, wherein in the display region, an orthographic projection of the isolation structure on the base overlaps an orthographic projection of the pixel defining layer on the base.

18. The display panel according to claim 17, wherein a distance between adjacent second openings is greater than or equal to 3 microns.

19. A display panel, comprising a display region and a non-display region connected to the display region;

the display panel further comprises:

a base;

a plurality of light-emitting devices, the light-emitting device comprising a first electrode, a light-emitting function layer, and a second electrode stacked on the base;

an isolation layer, comprising a plurality of isolation openings, wherein the light-emitting function layer is located in a corresponding isolation opening of the plurality of isolation openings;

a bank, disposed in the non-display region, the bank and the isolation layer being located on a same side of the base, wherein a projection of the bank on the base surrounds the display region; and a power wire, electrically connected to the second electrode, wherein the non-display region comprises a first bezel region, the first bezel region comprises a first side circuit region located between the bank and the display region, and the power wire is disposed in at least part of the non-display region excluding the first side circuit region;

wherein the isolation layer further comprises a pixel defining layer and an isolation structure; and the pixel defining layer is disposed on a side of the base of the display panel, and the isolation structure is disposed on a side of the pixel defining layer facing away from the base; the isolation structure is enclosed to form a first opening, the pixel defining layer is enclosed to form a second opening, and an orthographic projection of the second opening on the base is in an orthographic projection of the first opening on the base; one of the plurality of isolation openings comprises the first opening and the second opening; and the light-emitting function layer is at least partially located in the second opening;

wherein an orthographic projection of the isolation structure on the pixel defining layer is located between adjacent second openings;

the isolation structure comprises a support portion and a blocking portion, and the support portion is located between the blocking portion and the pixel defining layer; an orthographic projection of the blocking portion on the pixel defining layer covers an orthographic projection of the support portion on the pixel defining layer; and a second electrode of a light-emitting device on at least one side of the isolation structure is connected to the support portion of the isolation structure, and the support portion is electrically conductive;

wherein a thickness of the support portion is greater than a thickness of the second electrode, and the thickness of the support portion is greater than or equal to 5000 angstroms.

* * * * *